(No Model.) 2 Sheets—Sheet 2.

W. S. HILL.
ELECTRIC MOTOR.

No. 457,534. Patented Aug. 11, 1891.

WITNESSES
Jno. G. Hinkel.
S. D. Johnson.

INVENTOR
W. S. Hill
by Foster & Freeman
Attorney

UNITED STATES PATENT OFFICE.

WARREN S. HILL, OF BOSTON, MASSACHUSETTS.

ELECTRIC MOTOR.

SPECIFICATION forming part of Letters Patent No. 457,534, dated August 11, 1891.

Application filed June 23, 1890. Serial No. 356,339. (No model.)

*To all whom it may concern:*

Be it known that I, WARREN S. HILL, a citizen of the United States, residing at Boston, Suffolk county, Massachusetts, have invented certain new and useful Improvements in Electric Motors, of which the following is a specification.

My invention relates to electric motors; and it consists in the features of construction and arrangement hereinafter more particularly pointed out.

Figure 3:
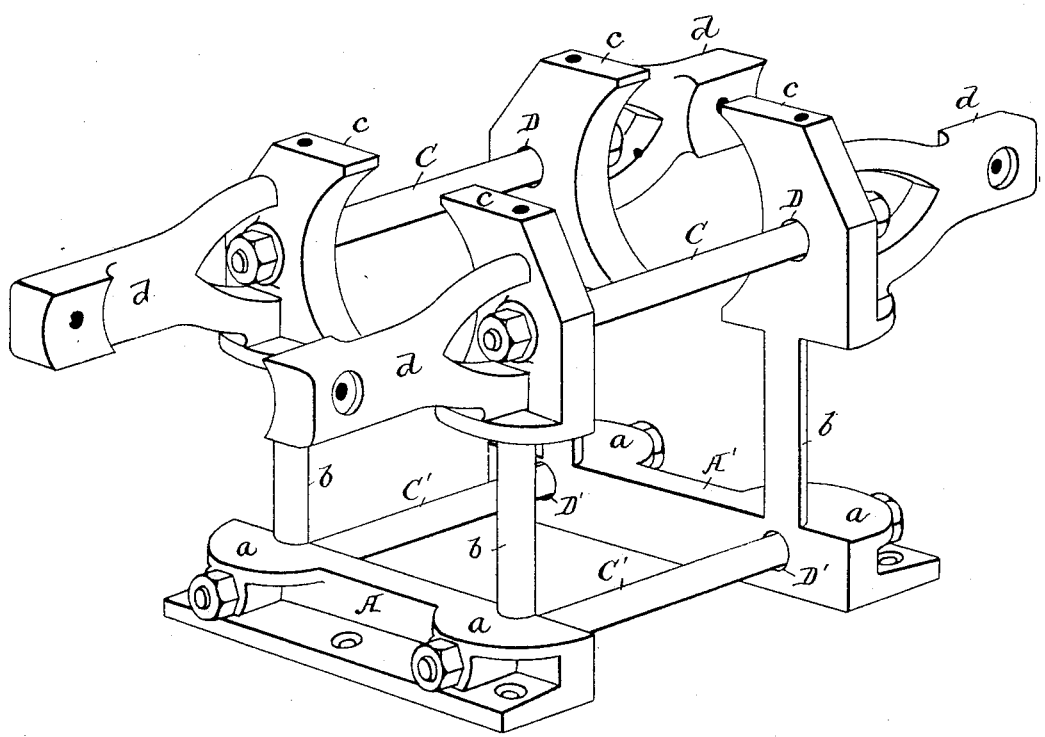
Figure 4:
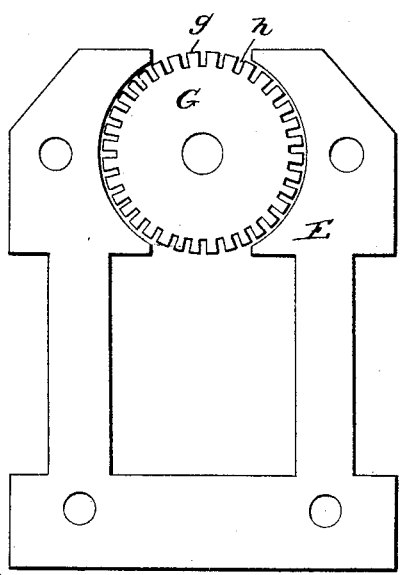
Figure 4:
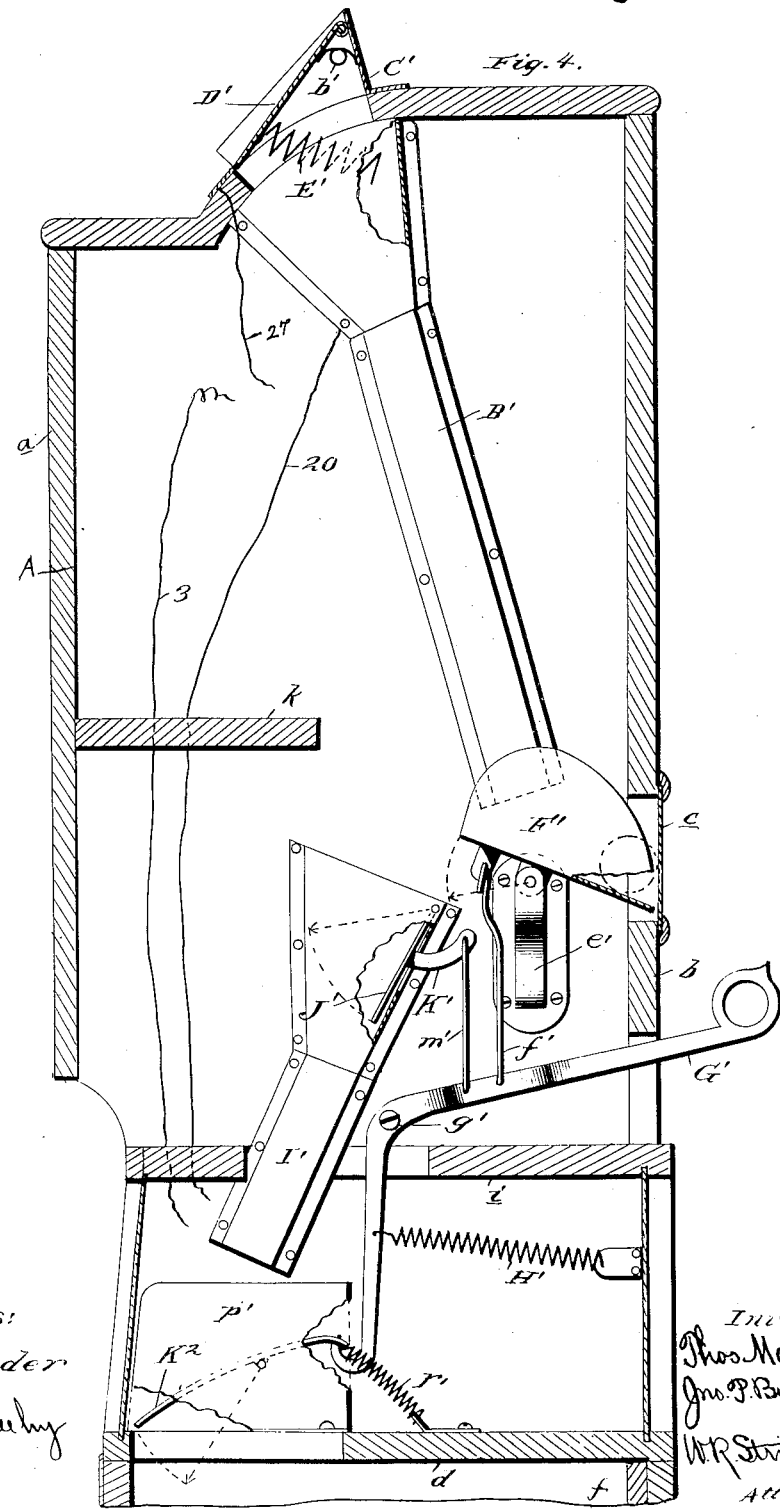

Referring to the accompanying drawings, Figure 1 is a plan view of a motor embodying my invention. Fig. 2 is a side view, partially in section, of the frame of the motor. Fig. 3 is a perspective view showing the frame of the motor, and Fig. 4 is a side view of one of the plates of the field-magnet.

One of the essential features of my invention relates more particularly to the field-magnets of the motor. These magnets are made up of thin plates of sheet metal stamped or otherwise cut or formed into the desired shape, as shown in Fig. 4, the magnets being composed of a greater or less number of these plates placed side to side. In order to hold these plates firmly in position and to make a compact mass of metal, I provide metal end plates and means for securing and holding them against the sheet-metal plates of the field-magnets. In doing this I preferably construct a metallic frame out of cast or wrought iron, the parts of which are secured together by bolts and adjusting-screws, and I clamp the sheet-metal plates between them.

Referring more particularly to Figs. 2 and 3, A A' represent two end plates forming what may be termed the "shell" or "skeleton" of the motor. Each one of these plates consists of a base-piece *a*, having two uprights *b*, preferably formed integral therewith, the upper ends of which are curved to correspond to the shape of the poles *c*. Secured to and preferably forming a part of each of the uprights or standards *b* are the extensions or arms *d*, which furnish the bearings for the armature-shaft D, and these are bifurcated at their point of junction with the upright standards, not only to strengthen them, but to furnish ready access to the nuts or bolts which clamp the end plates together. The standards *b* are preferably rounded, as shown in Fig. 2, for the reception of the field-magnet coils. The field-magnets, as before stated, consist of plates of sheet-iron cut substantially in the shape shown in Fig. 4, and a number of these are clamped together between the end pieces A A'. In order that they may be so clamped, the rods C C' extend through perforations in the plates, and are provided at their ends with nuts or bolts for tightening them. In order to prevent one or more of the plates interfering with the shoulders on the bolts, and thereby precluding their being properly tightened, I recess the end plates at the bolt-holes, as shown at D, and the rods C have their ends reduced to pass through the openings in the end plates A A'.

As it is exceedingly difficult in magnets made up of thin plates to adjust the parts accurately and at the same time tightly, I have found it advantageous to use the skeleton frame above described and to secure the two parts of the frame together by the rods having reduced ends and abutments fitting into the recesses in the face of the plates. In this way the nuts can be tightened, compressing the plates between the sides of the frame and seating the abutments in the recesses, when the frame will be in proper adjustment and accurately support the armature-shaft. This arrangement is of greater importance in view of the fact that the projections forming the bearings or supports for the armature-shafts are made integral with the end plates, and it is therefore desirable that they can be readily and definitely adjusted. In this way it will be seen that the field-magnets proper are composed of plates of sheet metal E, which are securely held and clamped together by the end pieces A A', and I am enabled thereby to form a practically homogeneous and compact magnet that is simply made and not liable to get out of order. The arms or projections for supporting the armature being formed integral with the end plates furnish a rigid support for the armature-bearings F, which may be secured to and held in position by nuts *f*, passing through holes in the arms or extensions, and by this means an accurate adjustment of the armature-shaft is provided, so that the armature will run evenly and smoothly and yet be in close relations to the field-magnet poles.

(No Model.) 6 Sheets—Sheet 1.
T. MANGAN & J. P. BUCKLEY.
FARE BOX.
No. 457,545. Patented Aug. 11, 1891.
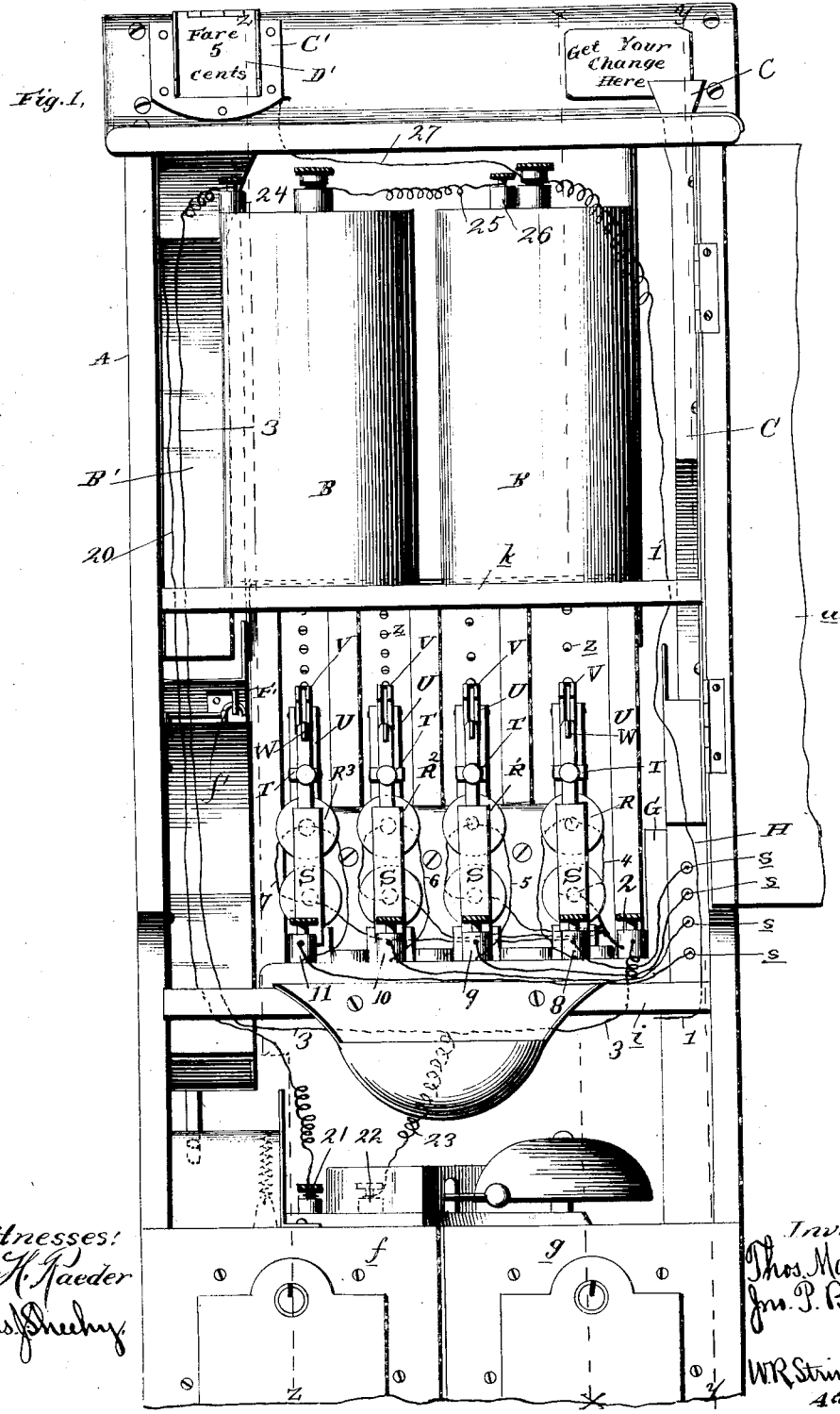

(No Model.) 6 Sheets—Sheet 2.
T. MANGAN & J. P. BUCKLEY.
FARE BOX.
No. 457,545. Patented Aug. 11, 1891.
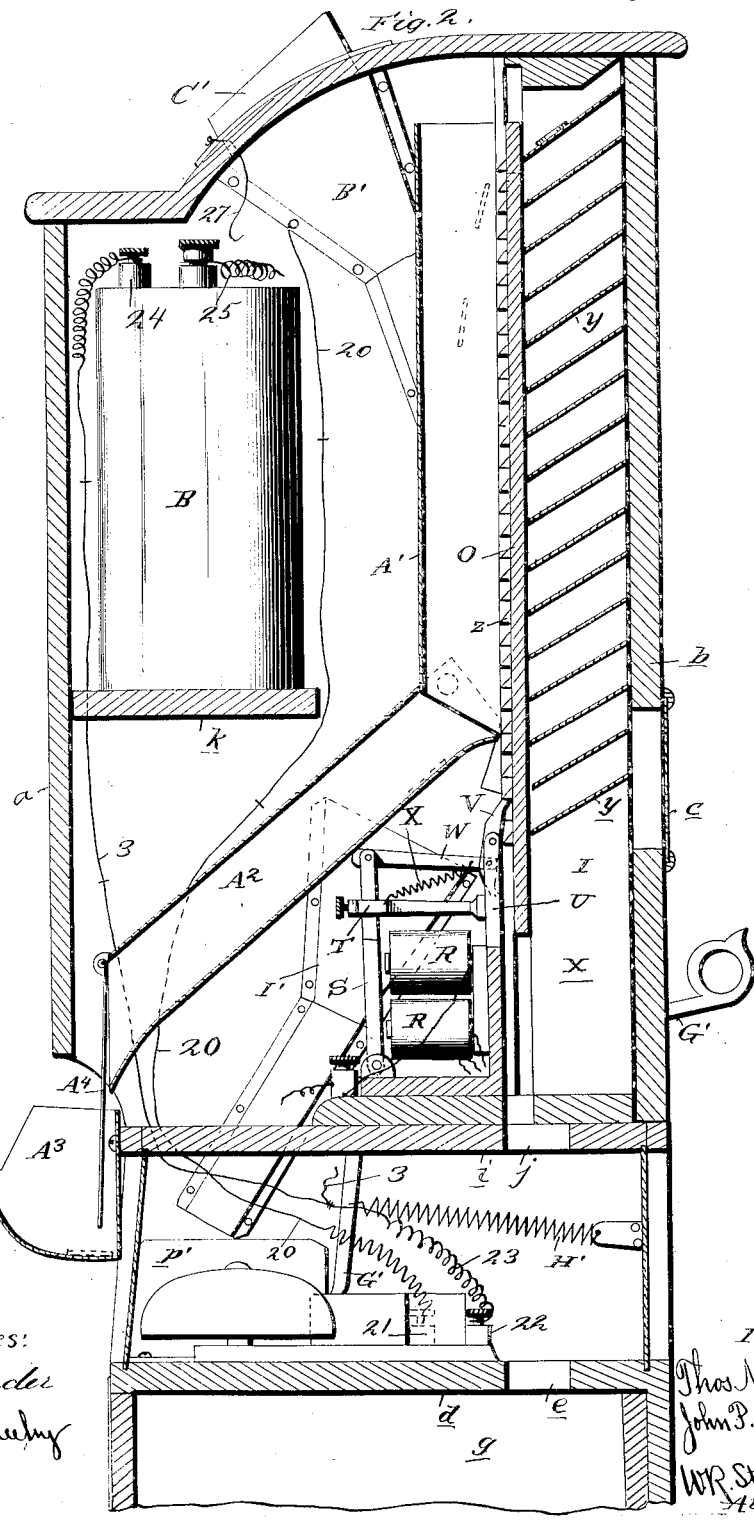
Witnesses:
Inventors
Thos. Mangan
John P. Buckley
W. R. Stringfellow
Attorney

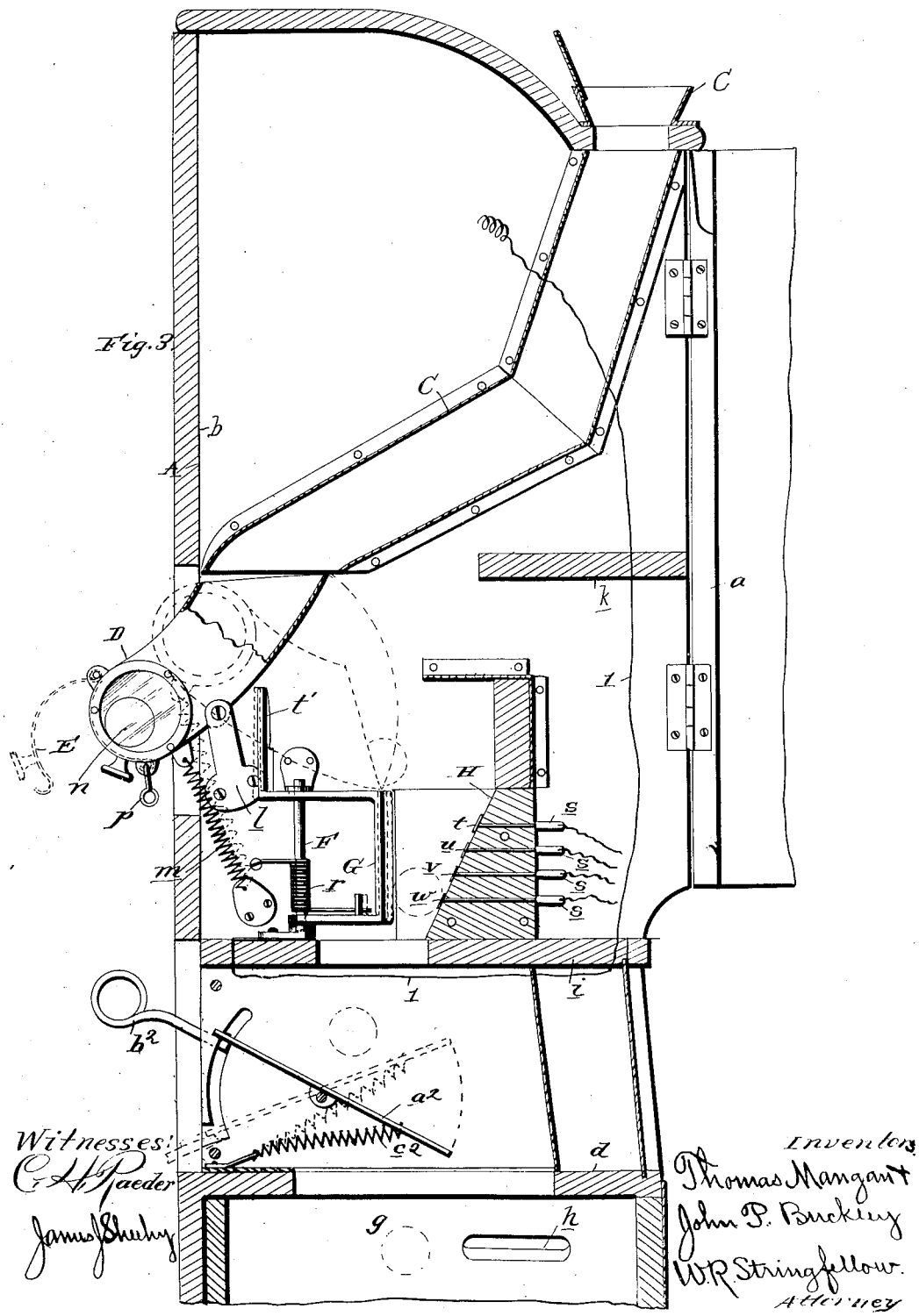

(No Model.) 6 Sheets—Sheet 4.

T. MANGAN & J. P. BUCKLEY.
FARE BOX.

No. 457,545. Patented Aug. 11, 1891.

Witnesses:
H. Raeder
James Sheehy

Inventors
Thos. Mangan
Jno. P. Buckley
W. R. Stringfellow
Attorney (No Model.) 6 Sheets—Sheet 5.
T. MANGAN & J. P. BUCKLEY.
FARE BOX.
No. 457,545. Patented Aug. 11, 1891.
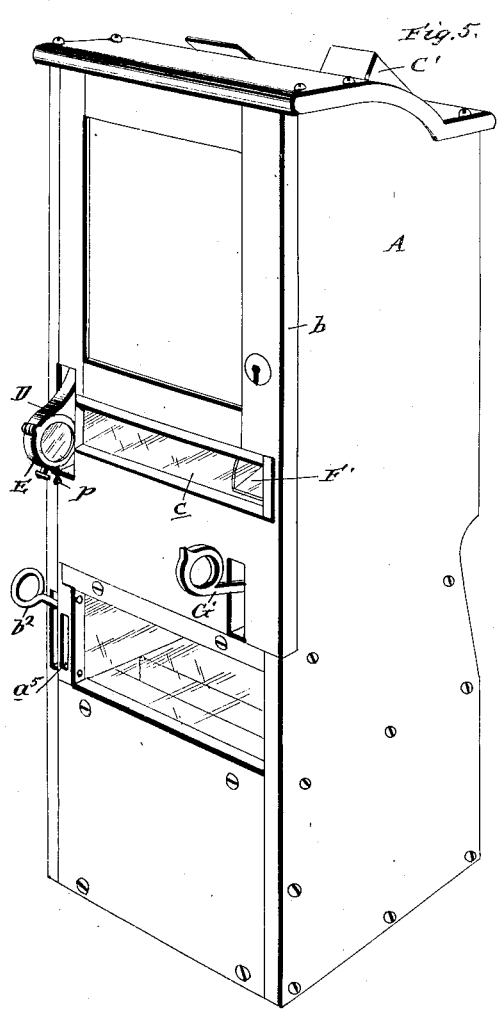
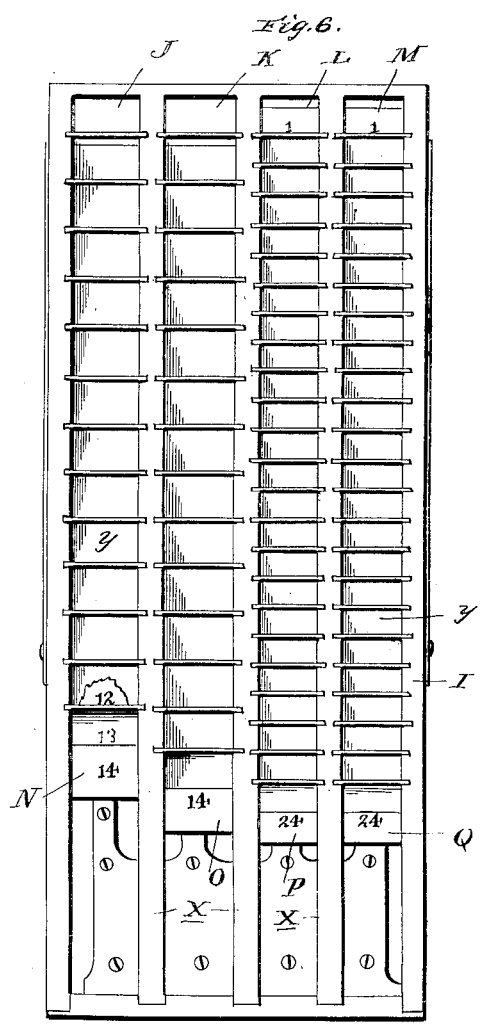
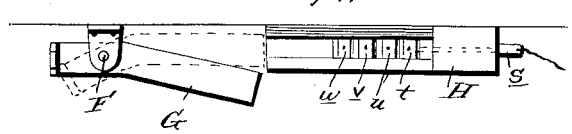
Witnesses:
Inventors
Thomas Mangan +
John P. Buckley.
W. R. Stringfellow.
Attorney (No Model.)

T. MANGAN & J. P. BUCKLEY.
FARE BOX.

No. 457,545. Patented Aug. 11, 1891.

Witnesses:
C. H. Raeder
James Sheehy

Inventors
Thomas Mangan &
John P. Buckley
Wm R. Stringfellow
Attorney

UNITED STATES PATENT OFFICE.

THOMAS MANGAN AND JOHN P. BUCKLEY, OF NEW ORLEANS, LOUISIANA; SAID BUCKLEY ASSIGNOR TO SAID MANGAN.

FARE-BOX.

SPECIFICATION forming part of Letters Patent No. 457,545, dated August 11, 1891.

Application filed January 3, 1891. Serial No. 376,594. (No model.)

*To all whom it may concern:*

Be it known that we, THOMAS MANGAN and JOHN P. BUCKLEY, citizens of the United States, residing at New Orleans, in the parish of Orleans and State of Louisiana, have invented certain new and useful Improvements in Fare-Boxes; and we do declare the following to be a full, clear, and exact description of the invention, such as will enable others skilled in the art to which it appertains to make and use the same.

Our invention relates to improvements in fare-boxes for street-railway cars and other public conveyances; and the objects of the invention, among other things, are, first, to provide a fare-box embodying mechanism for automatically changing coins of various denominations, whereby the passenger may change his money and deposit the requisite fare in the box without disturbing the driver; secondly, to provide the tube or conveyer in which the money to be changed is deposited with a stop device whereby the driver may inspect the coin before turning the same into the change-making apparatus, said stop device being provided with a gate or door through which the coin may be removed by the driver and returned to the passenger if defective or of a denomination which the machine is not adapted to change; thirdly, to provide a device whereby a coin which has been deposited in the tube or conveyer for the "money to be changed" and has passed between the change-making mediums and made change may be obtained by the driver, for a purpose hereinafter described; fourthly, to provide the conveyer in which the required fare is to be deposited with a gate or door at its mouth, which door, being pressed back to open the conveyer, closes an electrical circuit and rings a bell to notify the driver that a fare has been deposited, and, fifthly, to provide the conveyers for the fares with a series of tilting plates or gates whereby the deposited fare is first stopped at the front of the box, where it may be inspected by the driver, who, by shifting or tilting the first plate, discharges said fare upon a gate in the mouth of a conveyer leading to the back of the box and adapted to discharge upon another tilting plate, all of which plates are adapted to be operated by a single lever, whereby when the tilting plates at the bottom of the respective conveyers are opened by depressing the actuating-lever the gate in the mouth of the lower conveyer is closed, thus preventing a discharge of the coin into the fare-box without resting in sight of the passengers.

With these and other ends in view the improvements will be fully understood from the following description and claims, when taken in connection with the accompanying drawings, in which—

Figure 8:
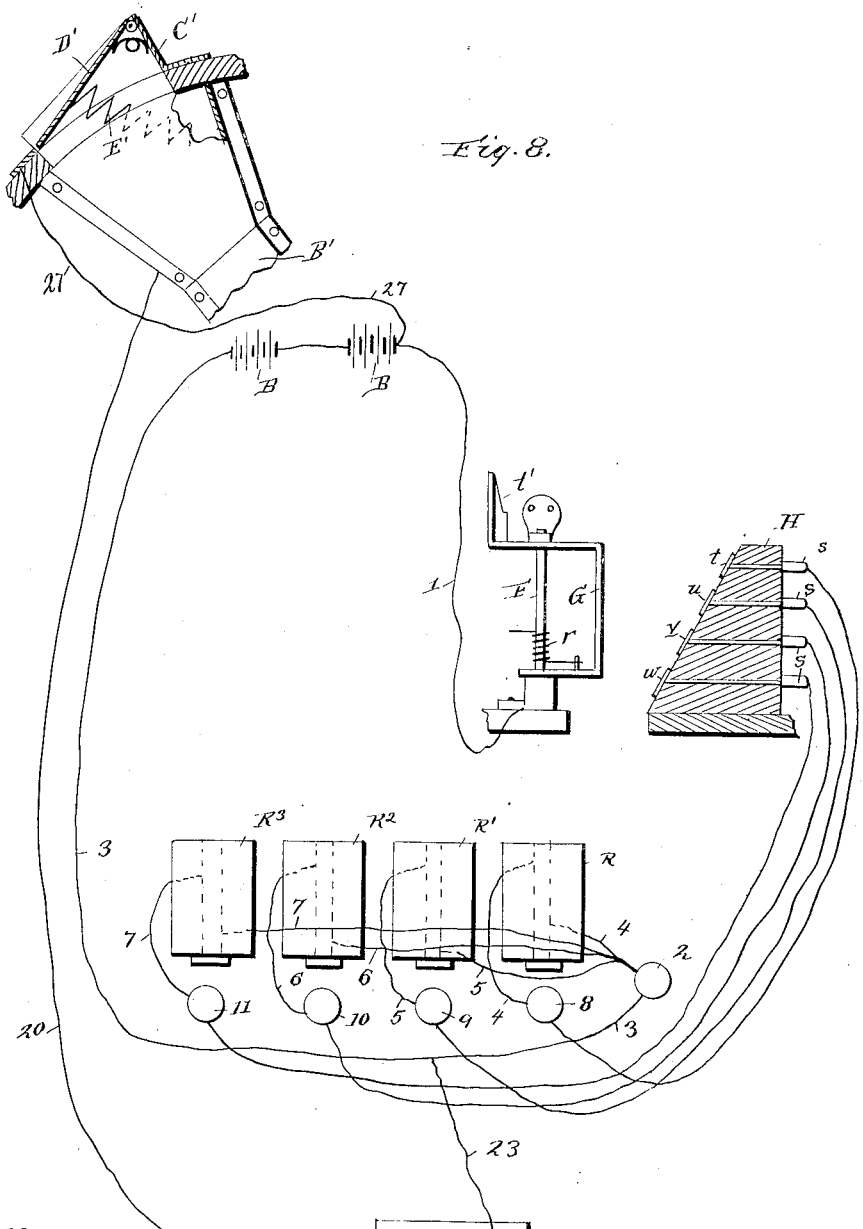

Figure 1 is an elevation of our improved fare-box looking from the inside of the car, the door being open and partly broken away. Fig. 2 is a vertical central section taken in the plane indicated by broken line $x$ $x$ on Fig. 1. Fig. 3 is a vertical section looking toward one of the side walls of the casing, said section being taken in plane indicated by broken line $y$ $y$ on Fig. 1. Fig. 4 is a vertical section taken on the side of casing opposite to Fig. 3, the plane of this figure being indicated by broken line $z$ $z$ on Fig. 1. Fig. 5 is a perspective view of the casing looking from the front and illustrating the projecting levers, &c., to be operated by the driver. Fig. 6 is a front elevation of the bank or change-frame removed from the casing. Fig. 7 is a top plan view of the contact-plate block and the pivoted or hinged frame between which the coin to be changed rests and closes an electrical circuit whereby the change-making apparatus is actuated. Fig. 8 is a diagrammatic view illustrating the electrical circuit-wires and the several elements of the apparatus forming part of the circuits, the latter being illustrated in this view irrespective of their positions in the complete apparatus.

Referring by letter and numeral of designation to the said drawings, in which like letters and numerals designate corresponding parts throughout the several views, A designates the casing of our improved fare-box, which is preferably of a general rectangular form and may be provided with any ornamentation and lettering desired. This casing A is provided with a rear door $a$ and a front door $b$, which latter door is provided with a transverse glass $c$, whereby the numbers on the change-releasing strips may be seen by the driver and the deposited fare may be inspected, and said door b is also provided with slots for the passage of levers, &c., designed to be operated by the driver. At a suitable elevation in the casing is arranged a horizontal partition d, upon which the alarm device, presently to be described, is mounted, and this partition d is provided adjacent to the front wall of the casing with a vertical slot e, extending transversely across said partition to allow of the descent of change-releasing strips, presently to be described. The horizontal partition d has also mounted upon it the lower tilting plate of one of the fare-conveyers, and between said horizontal partition d and the bottom of the casing are provided drawer-openings for the reception of the fare and change-money drawers, (designated by f and g, respectively,) which drawers are preferably of a rectangular form and may be locked in the casing in any preferable manner.

In the side of the casing A, adjacent to the "change-money" drawer g, is provided a slot h, as shown in Fig. 3, whereby the driver may deposit paper money, which he has changed for silver to enable the passenger to obtain small change through the medium of the automatic apparatus in the box. At a suitable distance above the partition d is arranged another horizontal partition i, which is designed to support the change-making apparatus, and is provided adjacent to the front wall of the casing with a vertical transverse slot j, in alignment with the slot e of the partition d, both of which slots, Fig. 2, are designed to allow the descent of the change-releasing strips, presently to be described.

At a suitable elevation in the casing, and preferably adjacent to the rear wall thereof, is provided a transverse platform k, upon which rests one or more electrical galvanic batteries B, designed to actuate the electrical change-making appliances, presently to be described, said batteries being provided with the usual binding-posts for the connection of the circuit-wires.

C indicates the receiving conveyer or way for the coins to be changed, which is attached to one side wall of the casing and is of a sufficiently-flat contour in cross-section to keep the coin on edge. This conveyer leads from the top of the casing, adjacent to one side and rear wall thereof, to a point about the proportional distance shown below the top and adjacent to the front wall of casing, where it discharges into an inspection stop-section D, Fig. 3, which is preferably of the same form in cross-section as the conveyer C and of a proportional size, substantially as shown. This inspection stop-section D is pivotally mounted, as better shown in Fig. 3 of the drawings, between a bracket-arm l, secured to the side wall of the casing, and said casing, and is adapted to normally lie in a position to receive coin from the conveyer C by reason of a retracting coil-spring m, which has one end secured to the under side of said stop, in advance of the pivot or fulcrum point thereof, and its other end attached to the side wall of the casing.

One of the side walls of the stop D is provided, adjacent to the forward end thereof, with a sight-glass n, whereby the driver may inspect the coin to be changed.

To provide for an exigency requiring the removal and return of the coin to the passenger, the circular forward and outer end edge of the stop D is formed by a circular hinged door E, which is provided with a knob and has its swinging end curved, as shown, whereby said door may be locked in a closed position by a transverse stay-pin p, taking through two depending ears of the side walls of the stop. Mounted in bearings upon the partition i and the side wall of the casing is the pivot-post F of a swinging frame G, which frame G is provided at the forward end of its upper branch, which extends in advance of the pivotal point, with a preferably integral vertically-extending branch t', which branch is beveled and shouldered on its side adjacent to the stop D for the engagement of said stop, for a purpose presently to be described. Surrounding the pivot-post F of the frame G is a coiled spring r, one end of which is secured to the side wall of the casing, while its other end engages a lug upon the lower horizontal branch of the frame G, whereby said frame is held normally out of alignment with the contact-plate block H, which is suitably secured to the side wall of the casing. The forward edge or side of the block H is inclined, as shown, and on this inclined edge, at suitable distances apart, are mounted the respective contact-plates t, u, v, and w, against which the various coins rest to complete their respective circuits and electrically energize the electro-magnets designed to actuate proper change making or releasing strips. Suitably secured to the respective contact-plates and leading through the block H are conductors s, to which are attached circuit-wires which lead, respectively, to the several pairs of magnets for actuating the armatures engaging respectively the "10-cents," "25-cents," "50-cents," and "one-dollar" change-releasing strips, as will be presently described.

I indicates the bank or change-frame, which is preferably of a rectangular form, as shown, and occupies a position in the casing adjacent to the front wall thereof, being mounted on the partition i, as better illustrated in Fig. 2 of the drawings. This bank or change-frame I is divided (in this particular fare-box) by means of vertical partition-walls x into four vertical compartments of different widths, each of which is provided for the greater portion of its length with subdividing transverse partitions y, which are designed to hold the change for different denominations of coins and are pitched inwardly, as better shown in Fig. 2, whereby the coins when released by